United States Patent [19]

Kahler et al.

[11] 3,833,187
[45] Sept. 3, 1974

[54] THRUST CONTROL APPARATUS FOR POD MOUNTED ENGINE

[75] Inventors: Charles Kahler, Kirkland; Lucas James Kimes, Seattle, both of Wash.

[73] Assignee: The Boeing Company, Seattle, Wash.

[22] Filed: May 11, 1973

[21] Appl. No.: 359,249

[52] U.S. Cl. ............ 244/12. D, 244/110 B, 244/54, 239/265.27, 60/230
[51] Int. Cl. ......................................... B64c 15/08
[58] Field of Search ... 244/12 D, 12 A, 23 A, 23 D, 244/110 B, 54, 52; 239/265.19, 265.27, 265.29, 265.35; 60/228, 230

[56] References Cited
UNITED STATES PATENTS

| 2,735,264 | 2/1956 | Jewett | 239/265.29 |
|---|---|---|---|
| 2,780,058 | 2/1957 | Beale et al. | 239/265.29 |
| 2,951,660 | 9/1960 | Giliberty | 244/23 D |
| 3,096,954 | 7/1963 | Bauger et al. | 244/23 D |
| 3,493,198 | 2/1970 | Roed | 244/110 B |
| 3,704,829 | 12/1972 | Hall | 239/265.35 |

FOREIGN PATENTS OR APPLICATIONS

| 1,283,690 | 12/1961 | France | 239/265.35 |
|---|---|---|---|
| 1,279,495 | 11/1961 | France | 60/230 |
| 1,100,385 | 2/1961 | Germany | 239/265.35 |
| 1,210,939 | 11/1970 | Great Britain | 60/228 |

*Primary Examiner*—George E. A. Halvosa
*Assistant Examiner*—Edward R. Kazenske
*Attorney, Agent, or Firm*—Christensen, O'Connor, Garrison & Stavelka

[57] ABSTRACT

A jet engine is connected to a mounting strut which extends downwardly and forwardly from the wing so that the exhaust nozzle of the jet engine is positioned forwardly of the leading edge of the wing. A thrust control device for use in conjunction with a pod mounted jet engine on an aircraft includes three rotatable panels which are mounted aft of the discharge nozzle of the jet engine on the mounting strut. The panels are nested on top of each other above the nozzle during cruise operation of the engine. A single actuator moves only a first of the three panels through a predetermined arc to a position rearwardly of the nozzle to divert the engine exhaust stream downwardly and rearwardly for powered lift operation. Sequencing mechanism interconnects the second and third panels with the first panel so that when the latter is moved beyond the predetermined arc, the second and third panels will be moved to a position blocking the rearward and lower portion of the nozzle so that the exhaust stream from the jet engine is diverted upwardly and forwardly for thrust reversing operation.

7 Claims, 11 Drawing Figures

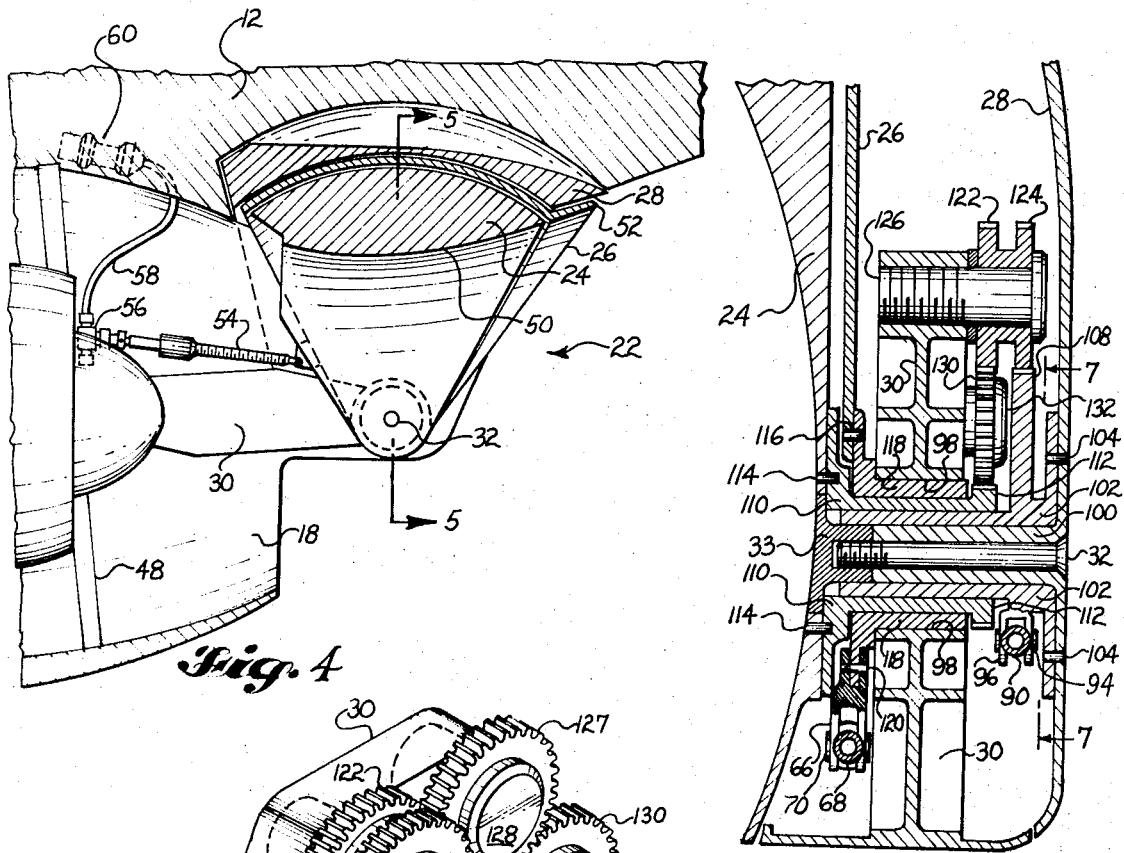
Fig. 4
Fig. 8
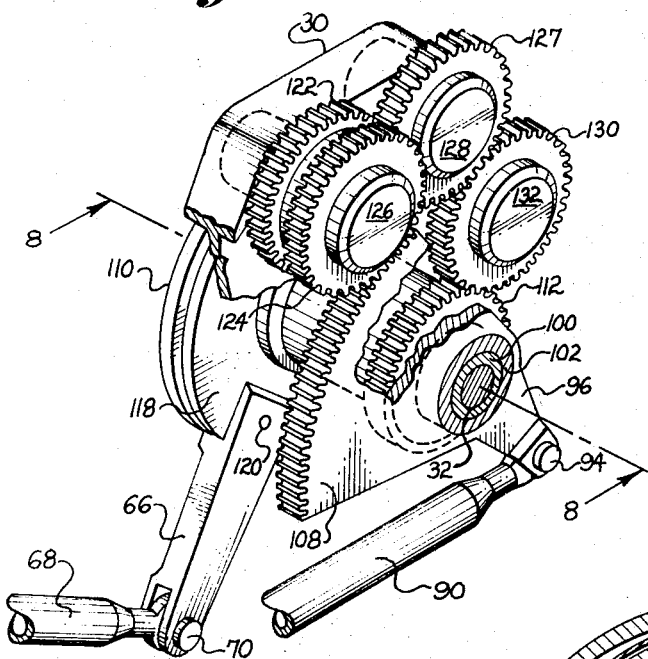
Fig. 7
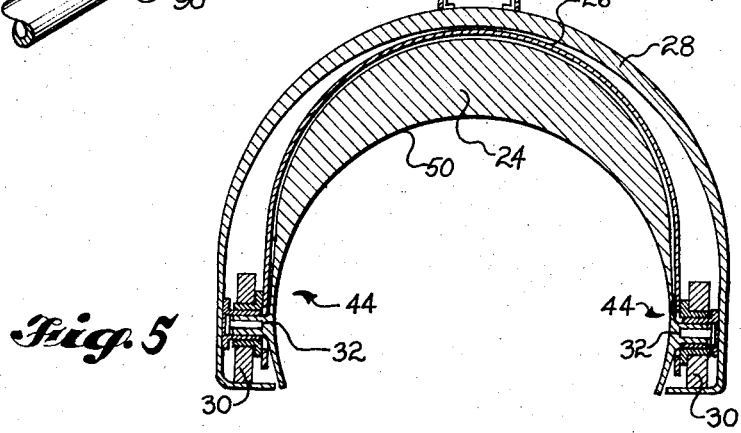
Fig. 5

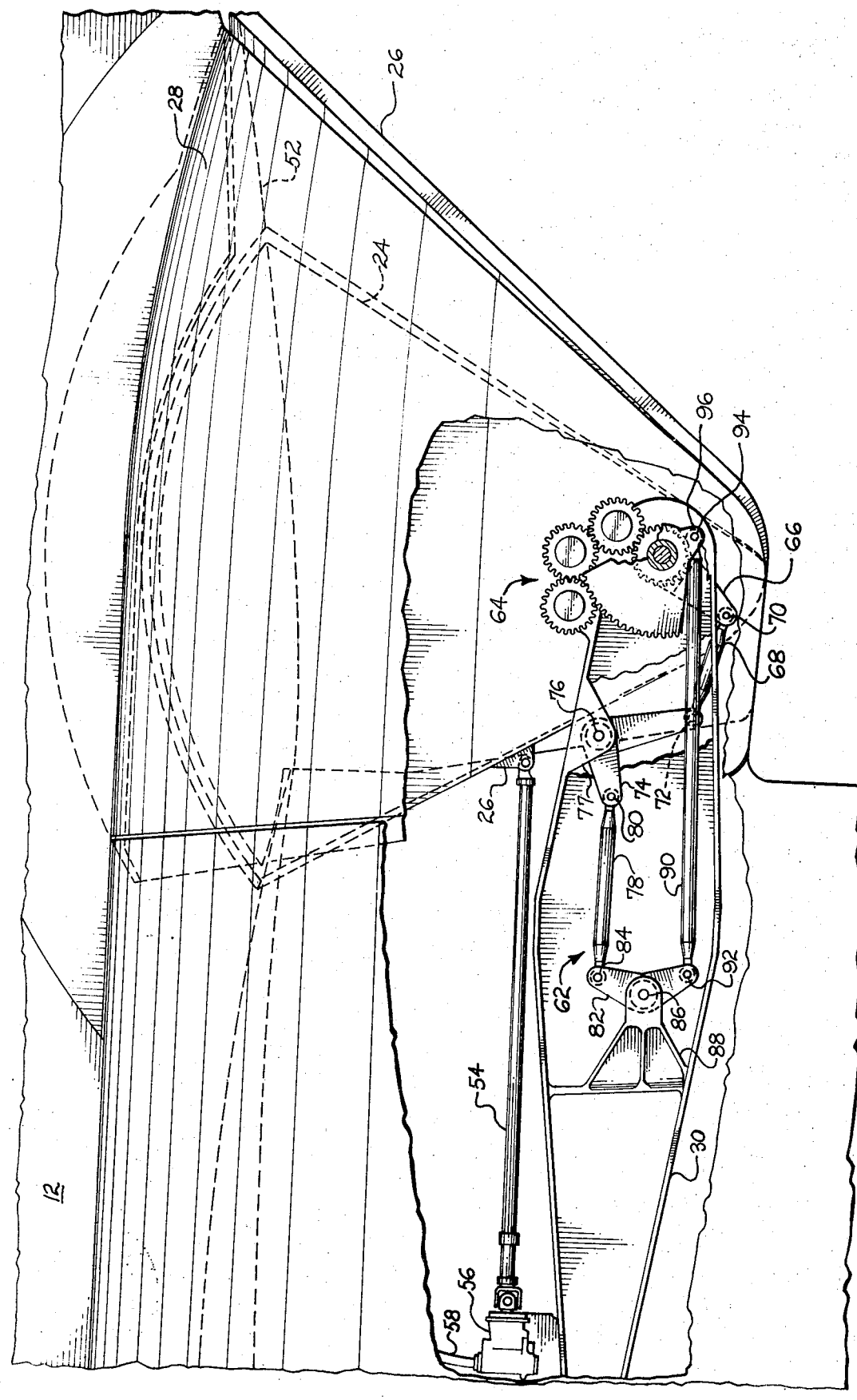

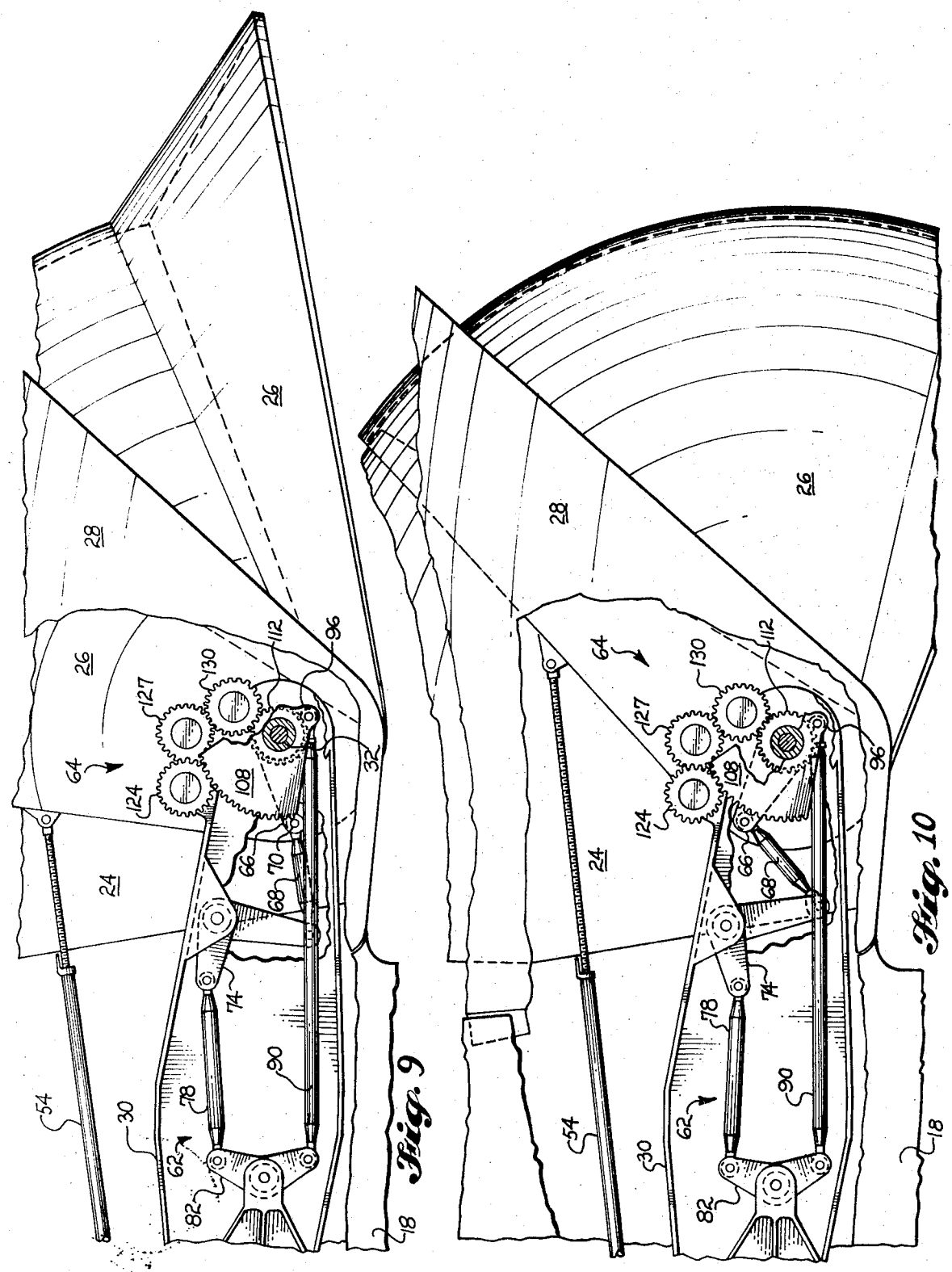

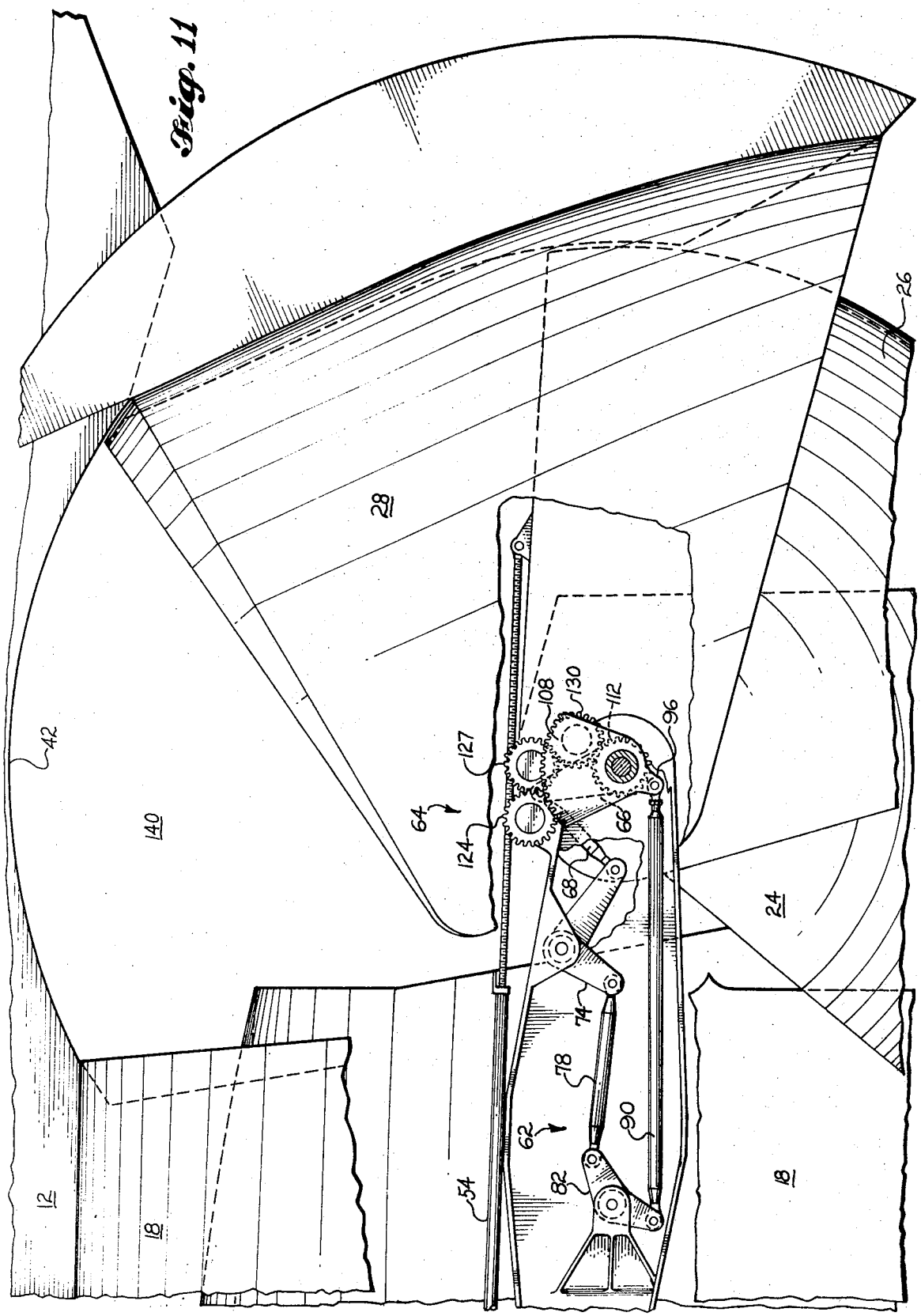

THRUST CONTROL APPARATUS FOR POD MOUNTED ENGINE

BACKGROUND OF THE INVENTION

The present invention relates broadly to a thrust control means for use in conjunction with a jet engine; to a configuration for mounting the jet engine on a mounting strut below an aircraft wing; and to apparatus for sequencing a plurality of thrust diverting panels mounted aft of a jet engine.

A present need exists for both commercial and military transport and passenger versions of short take off and landing (STOL) aircraft. STOL aircraft employ powered lift to augment conventional aerodynamic lift during take off and landing. When powered lift is utilized, a problem arises in the transition from powered lift operation to cruise operation wherein aerodynamic lift alone is desirable. This transition is accomplished in a number of ways, for example, by tilting the aircraft by using dual propulsion sources, by tilting the propulsion source or by diverting the exhaust stream from the propulsion source.

The present invention provides mechanism for diverting an exhaust stream from a thrust producing engine in a downward direction to provide powered lift. Other objects of the present invention are to provide an apparatus for further diverting the exhaust stream from the downward direction of flow to a forward and upward direction, thereby adding the capability of thrust reversing for dynamic braking; to provide an apparatus which combines the capability of thrust reversing and thrust diverting for powered lift into a single apparatus; to provide such apparatus which is relatively simple to build, maintain and operate; to provide such apparatus having only three major moving parts; to provide such apparatus which can utilize a single actuator with slave linkage; to provide such apparatus which is simply hinged about a single pivotal axis; to provide such apparatus which requires no critical pressure seals; to provide such apparatus which will not hinder engine removal and which can remain in place during engine removal; and to provide mechanism for sequentially actuating a plurality of panel members.

SUMMARY OF INVENTION

In one aspect the present invention provides a thrust control apparatus for a jet engine having an exhaust discharge nozzle at the rearward end thereof for discharging an exhaust stream in a direction substantially parallel to the longitudinal axis of the engine comprising a plurality of panel means located rearwardly adjacent of the discharge nozzle and trunnion means mounting the panel means on the engine for pivotal movement about an axis transverse to the longitudinal axis, the trunnion means and the panel means so associated as to locate the panel means in a cruise position adjacent the upper portion of the discharge nozzle in substantially noninterfering relationship with the exhaust stream issuing from the engine in a longitudinal direction with respect to the engine, the trunnion means mounting the panel means for pivotal movement to an exhaust diverting position rearwardly of the nozzle wherein the panel means form an impingement surface for diverting the exhaust stream from the engine in a downward and rearward direction with respect to the engine, and actuating means for moving the panel means between the cruise and thrust diverting positions.

In another aspect the present invention provides apparatus for sequentially moving a plurality of rotatably mounted members about their axes comprising a first member rotatably mounted on a support member, actuating means for rotating the first member about the support member, a second member rotatably mounted on the support member, and linkage means coupling the first and second members whereby movement of the first member through a first predetermined arc causes substantially no movement of the second member and movement of the first member through a second predetermined arc will cause said second member to move through a third predetermined arc.

BRIEF DESCRIPTION OF DRAWINGS

A better understanding of the present invention can be acquired by reading the ensuing specification in conjunction with the accompanying drawings wherein:

FIG. 4 is an enlarged longitudinal sectional view of the thrust control apparatus;

FIG. 5 is a cross-sectional view of the apparatus taken along section line 5—5 of FIG. 4, omitting the jet engine for clarity;

FIG. 6 is an enlarged view partially broken away showing the linkage and transmission assemblies for programming the sequence operation of the panels comprising the thrust control apparatus;

FIG. 7 is an isometric view of the transmission assembly shown in FIG. 6;

FIG. 8 is a cross-sectional view of the transmission assembly of FIG. 7 taken along a section line similar to that of 8—8 of FIG. 7;

FIG. 9 is a partially broken away view similar to FIG. 6 showing the position of the linkage and transmission assemblies in an intermediate position;

FIG. 10 is a partially broken away view similar to FIG. 6 showing the position of the linkage and transmission assemblies when the panels are in a maximum diverting position; and FIG. 11 is a partially broken away view similar to FIG. 6 showing the linkage and transmission assemblies when the panels are in a thrust reversing position.

DESCRIPTION OF PREFERRED EMBODIMENT

Figure 1:
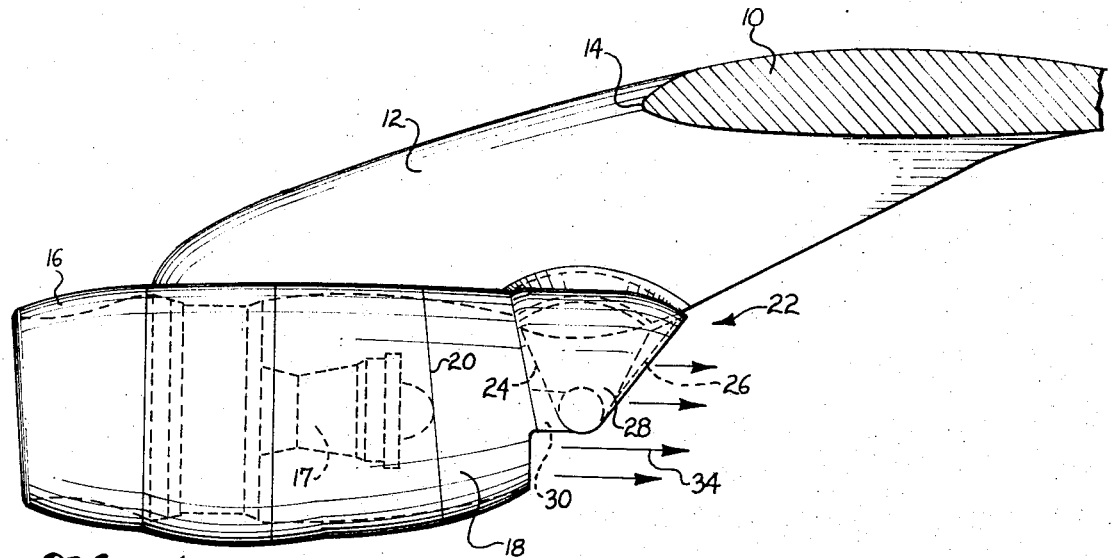
FIG. 1 is a pictorial view of a pod mounted engine employing the thrust control apparatus of the present invention, showing the apparatus in a cruise position.

Referring now to FIG. 1 a section of a wing 10 is connected to an aircraft (not shown) in a conventional manner. A strut 12 is cantilevered from the wing 10 at an angle downwardly and forwardly from the leading edge 14 of the wing 10. A nacelle 16 for a turbofan jet engine 17 is securely mounted to forward portion of the strut 12 so that the exhaust nozzle 18 of the engine is positioned forwardly of the leading edge 14 of the wing. The engine can be removed from the strut separately from the nozzle 18 along the joint 20 at the nozzle 18. The exhaust diverting apparatus, generally designated 22, is mounted on ribs extending rearwardly from each side of the nozzle 18. The exhaust diverting apparatus 22 includes three panels, an inner panel 24, a middle panel 26 and an outer panel 28. The three panels have downward extensions at each side thereof which are pivotally mounted (by means not shown in this view) on the rib 30.

Figure 2:
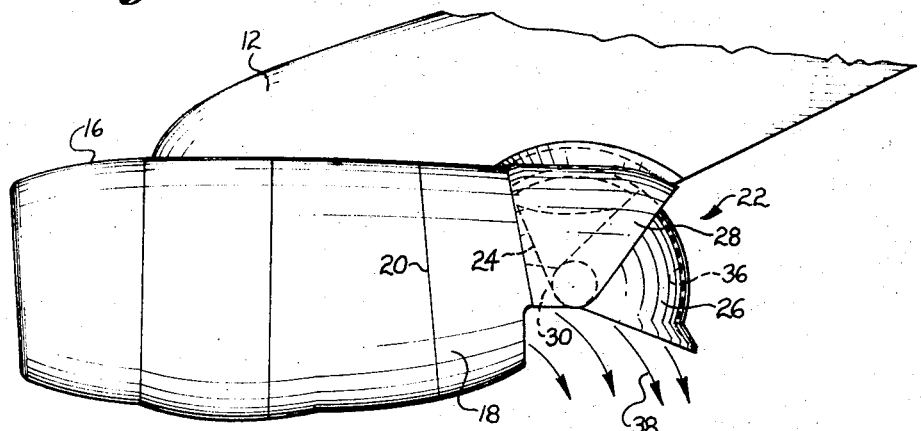
FIG. 2 is a pictorial view similar to FIG. 1 showing the thrust control apparatus in a thrust diverting position.

As shown in FIG. 1 the exhaust diverting apparatus 22 is in a cruise position, wherein all three panels 24, 26 and 28 are positioned rearwardly adjacent the upper portion of the nozzle, allowing the exhaust stream to exit longitudinally from the engine 17 as indicated by arrows 34. In FIG. 2 the middle panel 26 has been moved through an arc of about 75° without moving either the inner panel 24 or outer panel 28. As can be seen in dotted outline, the middle panel 26 has a concave inner surface 36 against which the exhaust stream from the discharge nozzle 18 impinges and is thereby turned downwardly as indicated by arrows 38. Thus the engine exhaust is diverted downwardly and rearwardly to produce an upwardly and forwardly directed thrust vector for powered lift. The actuating mechanism (to be described later) moves the middle panel 26 between its cruise position as shown in FIG. 1 and through an arc up to about 75° as shown in FIG. 2 so that the thrust can be vectored through angles of up to about 75°.

Figure 3:
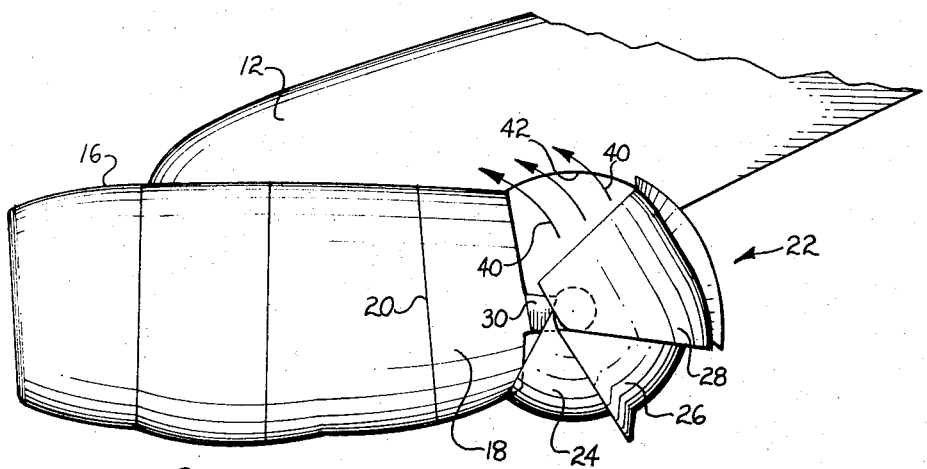
FIG. 3 is a pictorial view similar to FIGS. 1 and 2 showing the thrust control apparatus in a reversing position.

As shown in FIG. 3 the middle panel 26 has been rotated through an additional 30° to 50° from the position shown in FIG. 2. The movement sequencing apparatus for the panels (to be described later) during movement of the middle panel 26 to the position shown in FIG. 3 causes the inner panel 24 to move through approximately 180° to close off the bottom portion of a region behind the discharge nozzle 18 and likewise causes the outer panel 28 to rotate through approximately 60°. The inner surfaces of the inner panel 24, middle panel 26, and outer panel 28 provide a surface located rearwardly of the exhaust nozzle 18 against which the exhaust stream can impinge. The outer panel 28 has moved to a position wherein the region above and rearwardly of the exhaust nozzle 18 is opened, thereby allowing the exhaust stream to exit forwardly and upwardly, as indicated by arrows 40, from the diverting apparatus to provide a reversed thrust vector. Still referring to FIG. 3 an arcuate panel 42 which is formed on the bottom rearward portion of the strut 12 divides the reversed exhaust stream indicated by arrows 40 and splits it on each side of the strut 12.

Referring now to FIGS. 4 and 5 a collar 48 extends downwardly from the strut 12 and supports the nozzle 18 as well as rearwardly extending rib 30. The inner panel 24, the middle panel 26, and the outer panel 28 have outwardly and downwardly extending side portions, generally designated 44, thereon which are pivotally connected by pins 32 to the rearwardly extending ribs 30. As shown in FIGS. 4 and 5, the inner surface 50 of inner panel 24 is arcuate in two directions. From the center portion of the panel 24, its inner surface is upwardly curved in the fore and aft directions and is downwardly curved in the lateral direction with respect to the exhaust nozzle 18. In the cruise position the inner surface 50 of the inner panel 24 forms an extension of the exhaust nozzle 18 which does not interfere with the flow characteristics of the exhaust stream from the nozzle 18.

The middle panel 26 has an inner surface of concave configuration and is nested above the outer surface of inner panel 24. The upturned lip 52 on the rear edge of middle panel 26 forms an extension of the inner surface 50 of the inner panel 24 and thus forms a further extension of the exhaust nozzle 18. The inner surface of the outer panel 28 is also concave and is nested above the outer surface of the middle panel 26. The middle panel 26 is directly powered for pivotal movement about pins 32 by a jack screw actuating mechanism 54 driven through a gear train 56. The gear train 56 is driven through a housed rotary-type cable 58 from a pneumatic motor 60 mounted in the strut 12. Motor 60 is driven by bleed fan air from the turbofan engine.

The inner and outer panels 24 and 28 are sequentially powered, as described in conjunction with FIGS. 1 through 3, by a transmission mechanism best shown in FIGS. 6 through 8. The sequencing mechanism includes two operating portions, a linkage portion generally designated 62 and a gear transmission mechanism, generally designated 64. First describing the linkage, an arm 66 is directly connected to the middle panel 26. A link 68 is pivotally connected at one end by pin 70 to the arm 66 a spaced distance from the pivotal axis of the inner panel 24, middle panel 26, and outer panel 28, to the forwardly extending rib 30. The link 68 is connected at its other end by pivot pin 72 to a bell crank 74. The bell crank 74 is pivotally connected by pin 76 intermediate its two ends to a flange 77 connected to and forming part of the rib 30. The other end of the bell crank 74 is pivotally connected to a link 78 by pin 80. The other end of link 78 is pivotally connected to a second bell rank 82 by pin 84. The second bell crank 82 pivotally connected at its center portion by pin 86 to a flange 88 is also connected to and forming part of the rib 30. A third link 90 is pivotally connected at one end by pin 92 to the other end of bell crank 82 and is pivotally connected at its other end by pin 94 to an arm 96. Arm 96 is in turn securely fastened to the outer panel 28.

Referring now to the views of FIGS. 7 and 8, the gear transmission mechanism will be described. As can be seen in these views the link 68 is pivotally connected to arm 66. Likewise, the link 90 is pivotally connected to the arm 96. The central pin 32 serves as a central pivotal axis about which the inner panel 24, middle panel 26 and outer panel 28 are pivotally mounted. Pin 32 is secured in position by a threaded connection with nut 33. All of the panels are mounted by concentric sleeves in an inner bearing surface 98 on the rearwardly extending rib 30. In further detail the outer panel 28 is directly mounted for pivotal movement on pin 32 by sleeve 100. A second sleeve 102 connected to the outer panel 28 by pins 104 is also connected to the arm 96. A quadrant gear 108 is also formed as part of the sleeve 102. Sleeve 110 is mounted for pivotal movement about the sleeve 102 and a spur gear 112 is secured at the outer end of the sleeve 110. Sleeve 110 is connected to inner panel 24 by pins 114. The middle panel 26 is connected by pin 116 to a sleeve 118 mounted for pivotal movement about the sleeve 110. The arm 66 is also connected by pin 120 to the sleeve 118. Sleeve 118 also rides in the bearing surface 98 formed in the rearwardly extending rib 30.

A twin set of idler gears 122 and 124 are mounted for rotation on shaft 126 secured to rib 30. A second idler gear 127 is mounted for rotation on shaft 128 also fastened to rib 30. A third idler gear 130 is mounted for rotation on shaft 132 secured to rib 30. Gear 124 meshes with quadrant gear 108 and directly drives idler gear 122. Idler gear 122 meshes with the second idler gear 127 which in turn meshes with the third idler gear 130. The third idler gear 130 then meshes with the gear 112 connected to the sleeve 110.

Thus it can be seen that when the jack screw arrangement 54 (FIG. 6) is extended, the linkage, generally designated 64 (FIG. 6), allows a predetermined amount of movement of the panel 26 before the link 90 is significantly translated to rotate the quadrant gear 108. When the quadrant gear 108 is rotated by movement of link 90, the gear 112 is driven through the series of idler gears to rotate the inner panel 24. At the same time the outer panel 28 is rotated by the translation link 90 since the quadrant gear 108 is directly coupled to the outer panel. The gear ratio of the quadrant gear to the gear 112 is such that the outer panel 28 will move through an arc of about 45° while the inner panel 24 is caused to move through an arc of about 180°.

To better explain the operation of the sequencing mechanism of the present invention reference will be made to FIGS. 6 and 9 through 11. As already described in conjunction with FIG. 6 when the jack screw mechanism 54 is fully retracted, all panels 24, 26 and 28 reside in the cruise position, rearwardly adjacent the upper portion of the exhaust nozzle 18 of the engine. As shown in FIG. 9, as the jack screw mechanism 54 is partially extended, the middle door 26 is caused to rotate about its pivotal axis represented by pin 32, to a first exhaust diverting position. As shown, panel 26 has been rotated through approximately 45 degrees which will divert the exhaust stream from the nozzle 18 through an angle of deflection to approximately 45 degrees. It will be seen that the arm 66 connected to the middle door 26 rotates through the same arc. This movement of arm 66 will cause a slight pivotal movement of the bell crank 74. However, since the link 68 resides at nearly a right angle to the lower arm of bell crank 74, since the two arms of bell crank 74 are at right angles to each other and since the arm 66 is rotating through an arc representing its closest movement to the rest position of bell crank 74, only very slight motion is transmitted through the link 78, bell crank 82, and link 90 to arm 96. Thus little discernable movement is transferred to the arm 96 connected to the outer door 28, leaving both the inner and outer panels in their upper most position.

As shown in FIG. 10, as the jack screw mechanism 54 has been extended further from the position shown in FIG. 9 causing the middle panel 26 to rotate through an additional arc of approximately 30 to 35°. Again little or no discernable movement is transmitted to the arm 96 through the linkage generally designated 62. It is seen in FIG. 10 that the arm 66 is now in a position in conjunction with linkage 62 such that further rotational movement of the arm 66 will cause a significant amount of movement in the link 90. Thus the arm 66, connected to the outer panel 28, will be moved through a significant arc. In the position shown in FIG. 10 the exhaust stream from the engine will be diverted through an angle of approximately 70°. This represents a full thrust vectoring position.

Referring to FIG. 11 as the jack screw 54 is further extended to the full length of its travels, the middle panel 26 is moved through an additional 45° to 50°. This movement causes the arm 66 to move through the same arc. As it does so, the link 68 is further moved causing the bell crank 74 to pivot through about 60°. As this occurs the link 78 is moved, causing the bell crank 82 to pivot through about 60°. Consequently the link 90 is longitudinally translated to move the arm 96 through an angle of between 70° and 90°. As this occurs, the quadrant gear 108 is moved through the same arc causing rotation of the idler gear train, including gears 122, 124, 127 and 130. As described above, idler gear 130 in turn drives the spur gear 112 connected to the inner door 24. Thus, as the outer door 28 moves through an angle of approximately 90° along with arm 96, the inner door 24 will be caused to move through an arc of approximately 180°. Thus, the region generally designated 140 above the exhaust nozzle 18 is opened. When the doors 24, 26 and 28 are in this position the exhaust stream from the nozzle 18 will be diverted upwardly and forwardly to function in a reversing mode, such as for braking or turning of an aircraft.

Although the present invention has been described in relation to a preferred embodiment, one of ordinary skill in the art will be able to effect various alterations, substitutions of equivalents, and other changes in the invention disclosed without departing from the original intent and concept of the invention. For example, various linkages which perform the same function as the linkage 62 can be substituted therefor. In addition, various transmission mechanisms and/or linkage mechanisms can be sustituted for the mechanism generally designated 64 for multiplying the rotation of the inner panel with respect to the outer panel. For some applications it may be desirable only to effect thrust vectoring, that is, diverting the thrust downwardly and rearwardly without employing the thrust reversing mode. In this instance, only a single door similar in function to that of the middle door need be employed. Likewise, in other applications thrust vectoring may not be desirable however, the thrust reversing mechanism might be employed. In this instance, the particular sequence in which the three doors of the preferred embodiment are operated can be altered to immediately effect the thrust reversing upon actuating the jack screw mechanism. In view of the foregoing possible alterations which may be made to the system without departing from the concept which those of ordinary skill in the art might effect, it is intended that the present invention be limited only by the definition contained in the appended claims.

What is claimed is:

1. In combination with a jet propulsion engine having an exhaust discharge nozzle at the rearward end thereof for discharging an exhaust stream in a rearward direction from said engine, said exhaust nozzle having an upper immoveable portion and a lower immovable portion, thrust control apparatus comprising:

a plurality of panel means located rearwardly of said discharge nozzle, means mounting said plurality of panel means in a first position above said exhaust stream and adjacent the upper portion of said exhaust nozzle wherein said plurality of panel means is in substantially noninterfering relationship with said exhaust stream issuing in a rearward direction from said engine, said means further mounting said plurality of panel means on said engine for pivotal movement from said first position about an axis transverse to the rearward discharge direction of said exhaust stream, actuating means for moving said panel means between said first position and a second exhaust reversing position wherein at least one of said plurality of panel means is moved to a location adjacent the lower immovable portion of said exhaust nozzle, the remainder of said panels being moved rearwardly and downwardly from said first position to form an opening between the uppermost of said plurality of panel means and the upper immovable portion of said exhaust nozzle, said plurality of panel means in said second position cooperating to form an impingement surface for diverting said exhaust stream through said opening and upwardly and forwardly relative to said engine.

2. The apparatus of claim 1 wherein said actuating means is capable of moving said panel means between said first position, said second position, and a third exhaust diverting position wherein at least on of said plurality of panel means is moved from said first position to a location intersecting at least a portion of said exhaust stream to form an impingement surface for diverting said exhaust stream downwardly and rearwardly relative to said engine.

3. The apparatus of claim 2 wherein said plurality of panel means comprise inner, middle and outer panels mounted for pivotal movement about said transverse axis, said panels having spaced side portions extending downwardly therefrom when said panel means are in said first position, said spaced side portions being located on mutually opposing sides of said exhaust stream, said panels having a substantially inverted U-shaped configuration, said outer panel being positioned above said inner panel and said middle panel being nested between said inner and said outer panels when said panel means are in said first position.

4. The apparatus of claim 3 wherein said axis is so oriented to intersect said exhaust stream issuing from said nozzle.

5. The apparatus of claim 3 wherein said inner panel has an inner surface which in said first position defines a rearward extension of the upper portion of said discharge nozzle.

6. The apparatus of claim 3, wherein said one of said panel means in said third position comprises said middle panel.

7. The apparatus of claim 3 wherein said one of said plurality of panel means in said second position comprises said inner panel and said uppermost panel means comprises said outer panel, and wherein said middle panel is positioned at a location between the locations of said inner and outer panels.

* * * * *